US007120001B2

(12) United States Patent
Kruska et al.

(10) Patent No.: US 7,120,001 B2
(45) Date of Patent: Oct. 10, 2006

(54) SURGE VOLTAGE PROTECTOR FOR USE IN POWER TRANSMISSION NETWORKS

(75) Inventors: Bernd Kruska, Berlin (DE); Kai Steinfeld, Berlin (DE)

(73) Assignee: Siemens Aktiengesellschaft, München (DE)

( * ) Notice: Subject to any disclaimer, the term of this patent is extended or adjusted under 35 U.S.C. 154(b) by 140 days.

(21) Appl. No.: 10/484,103

(22) PCT Filed: Jul. 16, 2002

(86) PCT No.: PCT/DE02/02636

§ 371 (c)(1),
(2), (4) Date: Jan. 16, 2004

(87) PCT Pub. No.: WO03/009310

PCT Pub. Date: Jan. 30, 2003

(65) Prior Publication Data

US 2004/0207969 A1 Oct. 21, 2004

(30) Foreign Application Priority Data

Jul. 17, 2001 (DE) ................................ 101 36 617

(51) Int. Cl.

| | |
|---|---|
| ***H02H 3/20*** | (2006.01) |
| ***H02H 9/04*** | (2006.01) |
| *H02H 1/00* | (2006.01) |
| *H02H 1/04* | (2006.01) |
| *H02H 3/22* | (2006.01) |
| *H02H 9/06* | (2006.01) |

(52) U.S. Cl. .................... 361/91.2; 361/117; 361/124; 361/125; 361/126; 361/127

(58) Field of Classification Search ............... 361/91.1, 361/111, 58, 91.2
See application file for complete search history.

(56) References Cited

U.S. PATENT DOCUMENTS

| | | | | |
|---|---|---|---|---|
| 4,656,555 | A | 4/1987 | Raudbaugh | |
| 4,700,169 | A * | 10/1987 | Tanno | 338/21 |
| 5,145,516 | A * | 9/1992 | Khodr | 106/1.12 |
| 5,565,838 | A * | 10/1996 | Chan | 338/21 |
| 5,721,664 | A * | 2/1998 | Uken et al. | 361/125 |
| 6,392,861 | B1 * | 5/2002 | Trinh et al. | 361/117 |
| 6,614,640 | B1 * | 9/2003 | Richter et al. | 361/117 |
| 6,778,374 | B1 * | 8/2004 | Berlovan et al. | 361/117 |

FOREIGN PATENT DOCUMENTS

| | | |
|---|---|---|
| EP | 0335480 A2 | 1/1989 |

* cited by examiner

*Primary Examiner*—Stephen W. Jackson
*Assistant Examiner*—Dharti H. Patel
(74) *Attorney, Agent, or Firm*—Morrison & Foerster LLP

(57) ABSTRACT

The invention relates to a surge voltage protector (1) which comprises a discharge current path with at least one varistor block (4*a*, 4*b*, 4*c*). In order to prevent the varistor blocks (4*a*, 4*b*, 4*c*) from bursting when an inner error is produced and an electric arc connected thereto is created, a coating (9, 9*a*, 9*b*, 9*c*) is applied in the region of the outer covering area of at least one varistor block (4*a*, 4*b*, 4*c*), said coating being made of a substance which triggers an electric flashover when a critical temperature of the varistor blocks (4*a*, 4*b*, 4*c*) is exceeded.

7 Claims, 1 Drawing Sheet

SURGE VOLTAGE PROTECTOR FOR USE IN POWER TRANSMISSION NETWORKS

CLAIM FOR PRIORITY

This application claims priority to International Application No. PCT/DE02/02636, published in the German language on Jan. 30, 2003, which claims the benefit of priority to German Application No. 101 36 617.5, filed in the German language on Jul. 17, 2001.

TECHNICAL FIELD OF THE INVENTION

The invention relates to a surge arrester for use in power transmission systems, and in particular having a discharge current path which has at least one varistor block, the varistor block having two contact regions and a casing region.

BACKGROUND OF THE INVENTION

In conventional surge arresters, two or more varistor blocks forming the discharge current path of the surge arrester are arranged one behind the other and are clamped between two end fittings. Such surge arresters are used in power transmission systems having differing voltage levels. An insulating material housing is arranged between the end fittings so that it surrounds the varistor blocks on the casing side of the casing. Nonconductive fibers are wound around the varistor blocks. Internal faults with such varistor blocks can lead to arcs being formed. In order to allow the hot gases produced by the striking of the arc to emerge from within the surge arrester, openings are provided between the nonconductive fibers. Furthermore, the nonconductive fibers hold the varistor blocks mechanically together so that the fragments formed when the varistor blocks burst in the event of a fault are held together (EP 0 335 480 A2).

SUMMARY OF THE INVENTION

The present invention discloses designing a surge arrester such that the risk of the varistor blocks bursting in the event of a fault is reduced.

In one embodiment of the invention, a coating, which serves to initiate an electric flashover in the event of a critical temperature of the varistor block being exceeded, is arranged in at least one part region of the casing region of the at least one varistor block.

With the aid of the coating provided according to the invention, in the event of a fault, an arc being struck early in the casing region prevents a flashover within the varistor block. The danger of the varistor block shattering is thus considerably reduced.

The material used for the coating may advantageously be an NTC thermistor material. Such a material reduces its electrical resistance at the critical temperature of the varistor blocks to such an extent that it causes a dielectric breakdown of the arrester path and thus an electric flashover is initiated. Such an NTC thermistor material can be produced using the same manufacturing methods as are common for manufacturing varistor blocks, namely sintering and glazing. The application of the coating can therefore be integrated easily in the manufacturing steps common for the production of varistor blocks.

In another embodiment of the invention, provision may alternatively be made for the coating to be formed from a pyrotechnic substance.

When the pyrotechnic substance is ignited as a result of the critical temperature of the varistor block, a conductive path of ionized gas is produced. This conductive path serves to initiate an electric flashover along the casing region of the varistor block. The conductive path immediately produces an arc outside the varistor block. The use of a pyrotechnic substance to form the coating is a particularly reliable embodiment. As regards the layer material, commercially available pyrotechnic substances based on nitrocellulose can be used.

Pyrotechnic substances based on nitrocellulose can be applied in a simple manner to the casing region of a varistor block. For example, a pasty solution of nitrocellulose in acetone may be used for applying the coating. The solvent evaporates after application and the nitrocellulose is fixed sufficiently permanently to the casing surface. The ignition temperature of nitrocellulose roughly corresponds to the critical temperature of the varistor blocks, so that the desired external flashover occurs before the varistor blocks are overloaded. Nitrocellulose can also be acquired inexpensively.

In an advantageous embodiment of the invention, the coating—independently of the respectively selected material—extends along a casing line of at least one varistor block. In this case, the layer may be applied to the outer surface of the varistor blocks or inserted into a groove. If a groove, in which the coating is arranged, is provided in the casing region, it is possible for the coating to be assigned to a varistor block without altering the outer contour of the block.

In the case of two or more varistor blocks arranged one behind the other, a coating which extends along a casing line surrounds each individual varistor block, so that it is ensured that the protective measure takes rapid effect regardless of which varistor block has the fault.

Provision may be made for the layer to be in the form of a ring.

Applying the coating in the form of a ring around a varistor block ensures a response time that is as short as possible. A layer in the form of a ring may, if necessary, also be combined with a layer running along a casing line. An arrangement of the layer in the form of a ring does, however, result in a greater amount of coating material being used. In an extreme case, the entire casing surface of a varistor block may be coated.

BRIEF DESCRIPTION OF THE DRAWINGS

Three exemplary embodiments of the invention are illustrated in the drawing, in which.

DETAILED DESCRIPTION OF THE INVENTION

Figure 1:
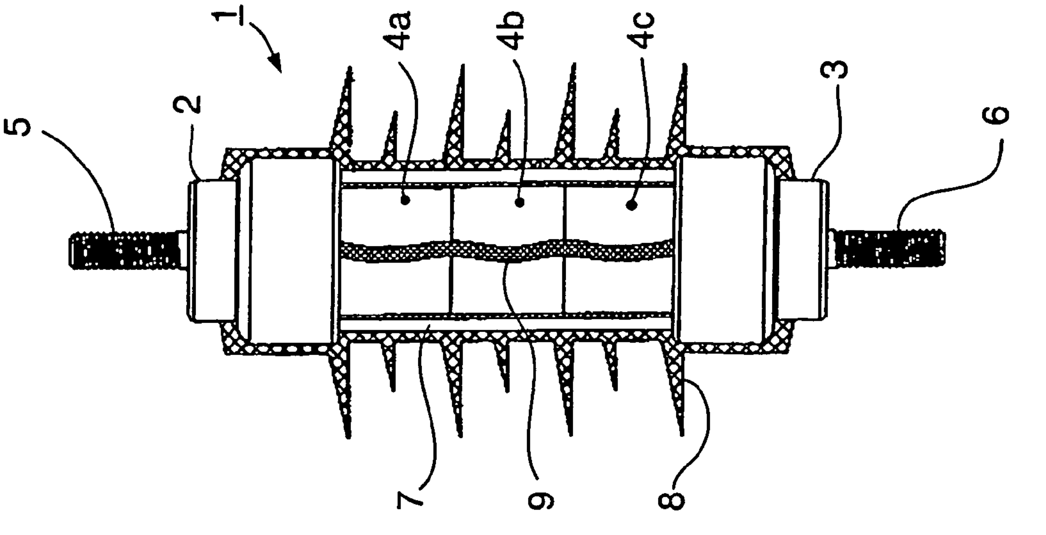
FIG. 1 shows a section through a surge arrester having a layer running along a casing line.

The surge arrester 1 illustrated in section in FIG. 1 has a first end fitting 2 and a second end fitting 3. A discharge current path comprising three varistor blocks 4*a*, 4*b*, 4*c* is arranged between the end fittings 2 and 3. In order to make electrical contact with and mechanically hold the surge arrester 1, a first connection bolt 5 is arranged on the first end fitting and a second connection bolt 6 is arranged on the second end fitting. The three varistor blocks 4*a,* 4*b,* 4*c* are braced with insulating rods 7 for mechanical stabilization purposes. In order to protect against external influences, the surge arrester 1 has an insulating material housing 8. A coating 9 of a material, which serves to initiate an electric flashover in the event of a critical temperature of the varistor blocks being exceeded, is arranged along a casing line of the varistor blocks 4*a,* 4*b,* 4*c*. The coating 9 may be made of, for example, an NTC thermistor material or a pyrotechnic substance. The way in which the coating 9 works is described by way of example using an embodiment of the layer as a pyrotechnic coating.

In the case of an internal fault in the surge arrester, for example in the event of a faulty varistor block 4*a* or 4*b* or 4*c,* the varistor blocks are heated owing to a fault current flowing through the discharge current path. When a critical temperature of approximately 200° C. is reached, the coating 9 is ignited and ionized gas is produced. This ionized gas then forms a conductive path between the first end fitting and the second end fitting. An arc forms immediately, owing to the high potential difference between the two end fittings. This arc burns outside the varistor blocks 4*a,* 4*b,* 4*c,* which prevents a flashover within the varistor blocks 4*a,* 4*b,* 4*c*. The excess gas pressure produced by the burning arc inside the surge arrester 1 can be dissipated by the insulating material housing 8 bursting open in a corresponding manner.

Figure 2:
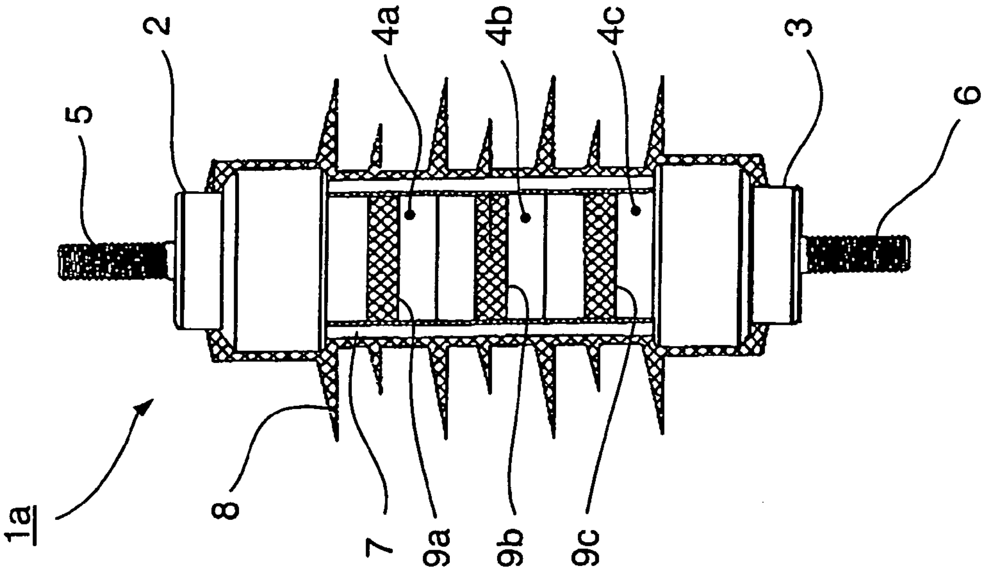
FIG. 2 shows a section through a surge arrester having two or more layers running in the form of a ring around the discharge current path.

The surge arrester 1*a* as shown in FIG. 2 has in principle the same construction as the surge arrester 1 illustrated in FIG. 1. The coatings 9*a,* 9*b,* 9*c* are merely arranged on the varistor blocks 4*a,* 4*b,* 4*c* in the form of a ring around the circumference. The pyrotechnic substance may be applied in various ways. As already mentioned, the pyrotechnic substance may be used in the form of a pasty solution. In the present case, the pyrotechnic substance [lacuna] wound onto the respective varistor block in the form of a strip-like structure.

Figure 3:
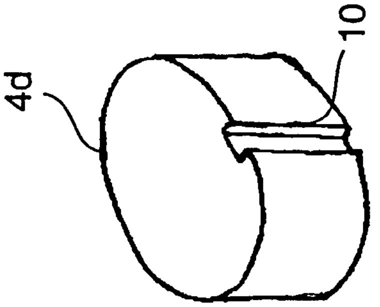
FIG. 3 shows a view of a single varistor block having a groove.

As shown in FIG. 3, a single varistor block 4*d* is provided with a groove 10 along a casing line. This groove can be filled with the material which serves to initiate an electric flashover in the event of a critical temperature being exceeded.

What is claimed is:

1. A surge arrester for use in electrical power transmission systems, comprising:

a discharge current path which has at least one varistor block, the varistor block having two contact regions and a casing region, wherein a coating, which serves to initiate an electric flashover in event of a critical temperature of the varistor block being exceeded, is arranged in at least one part region of the casing region of the at least one varistor block.

2. The surge arrester as claimed in claim 1, wherein the coating is made of an NTC thermistor material.

3. The surge arrester as claimed in claim 1, wherein the coating is made of a pyrotechnic substance.

4. The surge arrester as claimed in claim 3, wherein the coating is made of a substance based on nitrocellulose.

5. The surge arrester as claimed in claim 1, wherein the coating extends along a casing line of at least one varistor block.

6. The surge arrester as claimed in claim 1, wherein the coating is in the form of a ring.

7. The surge arrester as claimed in claim 1, wherein the coating is arranged in a groove.

* * * * *